Dec. 13, 1960     M. C. SYLVESTER     2,964,223
AUTOMOBILE LOADING APPARATUS
Filed Nov. 26, 1956
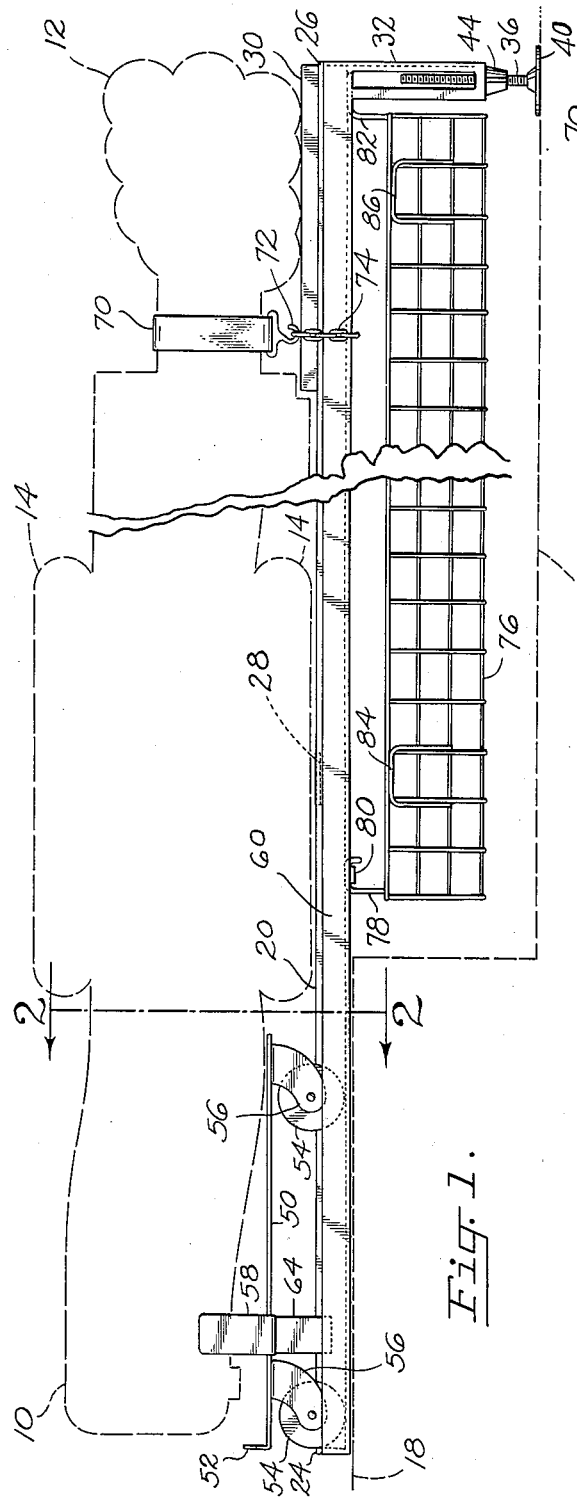
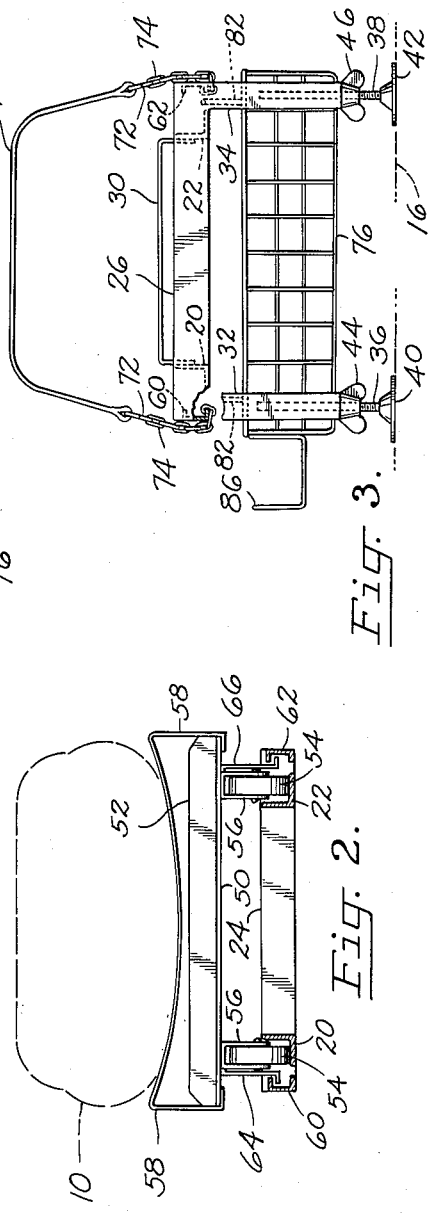
INVENTOR.
Minnie C. Sylvester
BY Eugene D. Farley
Atty.

United States Patent Office 2,964,223
Patented Dec. 13, 1960

2,964,223
AUTOMOBILE LOADING APPARATUS
Minnie C. Sylvester, 7512 SE. Martins, Portland, Oreg.
Filed Nov. 26, 1956, Ser. No. 624,300
2 Claims. (Cl. 224—42.44)

This invention relates to apparatus for loading automobiles with heavy articles. It pertains particularly to apparatus for loading into the trunks of automobiles, golf bags, outboard motors, and similar items which are heavy and awkward to handle.

As is well known, the loading of a 45 pound, club-filled golf bag endwise into the trunk of an automobile is a difficult operation, particularly for women, and may result in sprained backs and other injuries. In addition, because of the difficulty attending such loading and the substantial weight of the golf bag, the trunk carpet may become scuffed and worn and the bag or its contents may be damaged. Accordingly it is the general purpose of the present invention to provide apparatus for loading golf bags, outboard motors, luggage and similar equipment into the trunks, luggage compartments, and rear seat compartments, of automobiles, station wagons, and other vehicles.

The manner in which the foregoing and other objects of the present invention are accomplished will be apparent from the accompanying specification and claims considered together with the drawings, wherein:

Fig. 1 is a view in side elevation of the presently described automobile loading apparatus having a schematically illustrated golf bag resting thereon;

Fig. 2 is a sectional view taken along line 2—2 of Fig. 1; and

Fig. 3 is an end elevation of the loading apparatus of Figs. 1 and 2.

Generally stated, the automobile loading apparatus of my invention comprises a pair of tracks having spacing means for maintaining them in horizontally spaced apart relationship to each other. A wheeled platform is mounted on the tracks for reciprocation thereon, stop means being provided at the forward end of the tracks to limit movement of the platform.

At least one end of the tracks may be supported on legs, if necessary, to accommodate the apparatus to differences in elevation of the surface on which it is supported. A flat plate is provided between the tracks at the rearward end thereof for cooperating with the platform in supporting a load and suitable means are present for fastening the load to the apparatus. Also, there may be provided means for accommodating related items of golfers' equipment such as the golfer's cart, shoes, umbrella, etc.

Considering the foregoing in greater detail and with particular reference to the drawings:

In the drawings, the herein described apparaus is illustrated in conjunction with the loading of a golf bag 10 filled with clubs 12 and mounted in a collapsible cart "Bagboy" having wheels 14. The apparatus is depicted in place in the trunk of an automobile, the floor of the trunk having a lower level 16 and a stepped upper level 18.

The loading apparatus includes a pair of spaced tracks 20, 22 which may conveniently comprise angle irons arranged with the angles facing outwardly. The tracks are maintained in horizontally spaced relation to each other by means of transverse end pieces 24, 26, intermediate cross piece 28, and a horizontal flat plate 30. Cross piece 28 is designed to support the intermediate portion of the load while plate 30 is of sufficient dimensions to provide a support for one end of the load, e.g., the heads of golf clubs 12.

As has been indicated above at least one end of the apparatus may be supported on legs so that the apparatus may be used on surfaces where there are differences in elevation. Preferably, where the apparatus is to be used on the stepped floor of an automobile trunk, its outer end only is provided with legs 32, 34.

In the illustrated embodiment, such legs comprise U-shaped brackets which mount screws 36, 38 and are provided with feet 40, 42 at their lower extremities. The screws penetrate the connecting sections of the two legs of the U-shaped brackets. Wing nuts 44, 46 are threaded on the screws and bear against the brackets. Accordingly, the length of the legs may be determined by adjustment of the wing nuts to level tracks 20, 22, or, if desired, to slope them gently downwardly in the direction of the interior of the automobile trunk.

A wheeled platform is mounted on the tracks to support the bottom end of the load. Although this platform may assume a diversity of configurations suited for the accommodation of articles of various classes, in the illustrated form, adapted to mount the bottom end of a golf bag, it comprises a horizontal plate 50 having an up-turned forward end 52. It is supported on a plurality of wheels 54 mounted in yoke shaped brackets 56. A slightly arcuate bracket 58 is mounted on the platform for contacting and supporting the golf bag.

Wheels 54 are dimensioned to roll on tracks 20, 22 and accordingly the platform may be moved back and forth on the tracks. To assist in this movement, guideways 60, 62, which may comprise inwardly directed channel irons, are mounted between end pieces 24, 26 spaced apart from, outside of and substantially parallel to track members 20, 22.

Guides 64, 66 are mounted on platform 50 and have angled outer segments dimensioned to ride within guideways 60, 62, thereby guiding and stabilizing the platform as it moves back and forth on the tracks.

To secure the load on the apparatus, there may be provided fastening means comprising a strap 70, the ends of which are connected by hooks 72 to chain links 74 fastened to guideways 60, 62.

Still further, means may be provided for accommodating accessories in the assembly. Such accessories may include, for example, a basket 76 provided with rearward supporting brackets 78 adapted to loop over structural cross pieces 80. The forward end of the basket is provided with brackets 82 adapted to rest on the tops of legs 32, 34. Hooks or side brackets 84, 86 may be attached to one side or the other of the basket. Hence the basket may be used for storing miscellaneous items such as the golfer's shoes, while hooks 84, 86 may be used to accommodate his umbrella. The basket assembly may be mounted and demounted easily from the bottom of the loading apparatus by engaging or disengaging hooks 80, 82 therefrom.

In use, the hereindescribed loading apparatus may be placed in the trunk of an automobile longitudinally of the vehicle, with its forward end resting on the step usually present on the inner side of the trunk, and legs 32, 34 adjusted so that tracks 20, 22 are nearly level. Rolling platform 50 is moved rearwardly until golf bag 10 may conveniently be placed upon it.

The platform and bag are moved forwardly until wheels 56 abut against end piece 24 which acts as a stop. Strap 70 is fastened about the clubs to secure them into position. Where miscellaneous items are to be stored, they may be placed in a basket 76 or on hooks 84, 86. In this manner, the golf bag and related articles may be loaded in the trunk rapidly, conveniently, and without danger of back sprains or wrenches or damage to the automobile or bag.

It is to be understood that the form of my invention herewith shown and described is to be taken as a preferred embodiment of the same and that various changes may be effectuated without departing from the spirit of my invention as defined by the appended claims.

Having thus described my invention, I claim:

1. Loading apparatus for an automobile storage compartment comprising an elongated stationary framework adapted to be disposed longitudinally of the storage compartment in substantially horizontal position and having forward and rearward ends, a pair of parallel tracks on said framework extending substantially the full length thereof, a wheeled platform operable on said tracks for movement between forward and rearward ends of said framework, an arcuate load engaging arm mounted transversely on said platform, said arm being disposed above the platform and providing a cradled support for one end of the load, said wheeled platform being operable to carry one end of a load toward the forward end of the framework, a stationary transverse load supporting plate on the rearward end of the framework, a cross piece on said framework intermediate the forward and rearward ends thereof, said wheeled platform, transverse supporting plate and cross piece cooperating to support a load in the storage compartment wherein said platform and supporting plate support opposite ends of the load and said cross piece supports an intermediate portion of the load, and means at the rearward end of said framework for fastening said load thereto.

2. An article holding device for automobile storage compartments comprising an elongated load supporting horizontal framework disposed longitudinally of the storage compartment, transversely arranged support means on the under side of the framework, a container for articles disposed below the framework, bracket means detachably connecting the container to the support means in depending relation, and a pair of hook members mounted on one side of the container in longitudinal alignment for supporting additional articles.

References Cited in the file of this patent

UNITED STATES PATENTS

| | | |
|---|---|---|
| 2,091,069 | Girl | Aug. 24, 1937 |
| 2,091,070 | Girl | Aug. 24, 1937 |
| 2,091,071 | Girl | Aug. 24, 1937 |
| 2,094,401 | Girl | Sept. 28, 1937 |
| 2,547,083 | Lundgren | Apr. 3, 1951 |
| 2,568,628 | Herring | Sept. 18, 1951 |
| 2,764,381 | Anderson | Sept. 25, 1956 |
| 2,822,969 | Cooper | Feb. 11, 1958 |